(12) United States Patent
Peng et al.

(10) Patent No.: US 12,590,006 B2
(45) Date of Patent: Mar. 31, 2026

(54) ZEOLITES BASED ON WASTE INCINERATION FLY ASH AND PREPARATION METHODS THEREOF

(71) Applicant: ZHEJIANG UNIVERSITY, Hangzhou (CN)

(72) Inventors: Yaqi Peng, Hangzhou (CN); Hengsheng Pan, Hangzhou (CN); Shengyong Lu, Hangzhou (CN); Jiamin Ding, Hangzhou (CN); Weichao Kong, Hangzhou (CN); Hailong Li, Hangzhou (CN); Jianhua Yan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/251,836

(22) Filed: Jun. 27, 2025

(65) Prior Publication Data

US 2026/0001770 A1      Jan. 1, 2026

(30) Foreign Application Priority Data

Jun. 27, 2024      (CN) .......................... 202410846702.5

(51) Int. Cl.
C01B 39/02             (2006.01)
(52) U.S. Cl.
CPC ................................. C01B 39/026 (2013.01)
(58) Field of Classification Search
None
See application file for complete search history.

(56) References Cited

FOREIGN PATENT DOCUMENTS

| CN | 107311195 A | | 11/2017 |
|---|---|---|---|
| CN | 112897546 | * | 6/2021 |
| CN | 113955769 | * | 1/2022 |
| CN | 116651388 A | | 8/2023 |
| CN | 116651393 | * | 8/2023 |

(Continued)

OTHER PUBLICATIONS

Krishnaraj, "Impact of ball milled fly ash nano particles . . . ". int Journal of Control Theory and Applications. Oct. 12, 2017 (Year: 2017).*

(Continued)

*Primary Examiner* — Sheng H Davis
(74) *Attorney, Agent, or Firm* — PORUS IP LLC

(57)                ABSTRACT

A method for preparing zeolite based on waste incineration fly ash is provided, including: step (a) subjecting the waste incineration fly ash to acid washing to remove impurities, followed by water washing and drying; and step (b) adding a mixture of $FeCl_3$ and $FeSO_4$ to washed and dried waste incineration fly ash, followed by mixing with a alkaline solution, putting into a ball milling tank together with grinding balls for a mechanical chemical reaction, and heating reaction materials in a process of ball milling to obtain the zeolite; a mass ratio of $FeSO_4$ to $FeCl_3$ in the mixture being 5.5:1 and a mass ratio of the washed and dried waste incineration fly ash to the mixture being (5-10):1. The method employs acid washing to effectively remove most impurities from the waste incineration fly ash, significantly enhancing a ratio of silicon to aluminum, thus improving the purity of the synthesized zeolite.

6 Claims, 1 Drawing Sheet

(56) References Cited

FOREIGN PATENT DOCUMENTS

| | | | |
|---|---|---|---|
| CN | 117718074 | * | 3/2024 |
| JP | 2005060212 | * | 3/2005 |
| NL | 1004729 | * | 6/1998 |
| NL | 2030736 | * | 10/2022 |

OTHER PUBLICATIONS

First Office Action in Chinese Application No. 202410846702.5 mailed on Feb. 22, 2025, 15 pages.
Decision to Grant a Patent in Chinese Application No. 202410846702.5 mailed on Apr. 28, 2025, 4 pages.
Yao, Qi, One-step synthesis of zeolite by mechanochemical method of fly ash and its life cycle assessment, Wanfang Data, 2024, 93 pages.

* cited by examiner

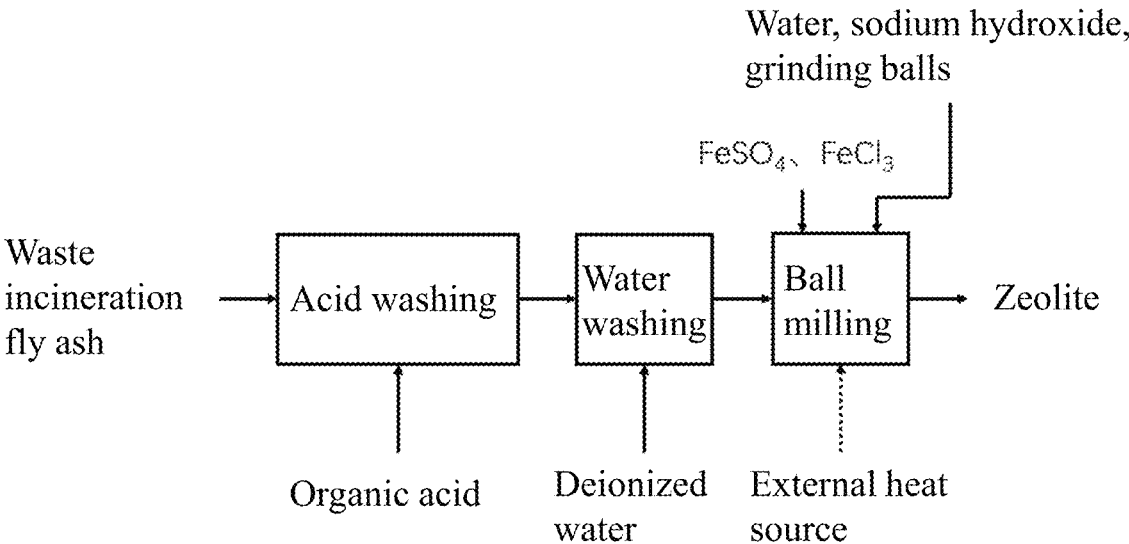

ZEOLITES BASED ON WASTE INCINERATION FLY ASH AND PREPARATION METHODS THEREOF

CROSS-REFERENCE TO RELATED APPLICATIONS

This application claims priority to the Chinese Patent Application No. 202410846702.5, filed on Jun. 27, 2024, the contents of which are hereby incorporated by reference.

TECHNICAL FIELD

The present disclosure relates to technical field of utilization of waste incineration fly ash, and in particular to a zeolite based on waste incineration fly ash and a preparation method thereof.

BACKGROUND

With the improvement of urbanization rate in China, the generation amount of solid waste such as municipal domestic waste has been increasing year by year, which not only restricts economic development, but also poses a threat to a living environment of human beings. At present, approximately 80% of the municipal domestic waste in China is incinerated for harmless treatment. However, a large amount of waste incineration fly ash is generated during the incineration process. Currently, the main disposal method for the waste incineration fly ash is landfill, which faces significant challenges in resource utilization.

The waste incineration fly ash is dark white or dark gray, with a micron-level particle size, presenting rod-like, polygonal, and spherical shapes. The waste incineration fly ash has high porosity, high specific surface area, and high contents of CaO and Cl, which can be used as a solid additive for producing cement and concrete and also be used in the hydrothermal synthesis of a zeolite. The zeolite is a crystalline aluminosilicate composed of exchangeable metal cations and $[SiO_4]^{4-}$ and $[AlO_4]^{5-}$, featuring a tetrahedral, three-dimensional spatial mesh structure, and abundant pore structure. The zeolite has excellent surface area and pore structure properties, a strong adsorption capacity, a high cation exchange capacity (CEC), and a good hydrothermal stability. As a result, it is widely used in environmental and industrial fields, including new fields such as adsorbents, catalysts, ion exchangers, and antibacterial materials.

At present, a synthesis method of a zeolite from the waste incineration fly ash is disclosed in Chinese Patent Application No. CN116651388A, entitled "A Method for Converting Waste Incineration Fly Ash into Zeolite Adsorbent Material and Its Product and Use". The method uses polyaluminum flocculant, red mud, and waste incineration fly ash as raw materials. The raw materials are thoroughly mixed and subsequently introduced into a supercritical water reactor. After solid-liquid separation, an activated polyaluminum fly ash gel is obtained. Water glass and polymeric aluminum ferric phosphate are then mixed with the gel, and the zeolite adsorbent material is obtained after curing for 3-15 days under natural conditions. Although the method has simple steps, the preparation cycle is too long, energy consumption in the preparation process is high, and economic efficiency is poor.

With the growing demand for zeolite products in terms of performance and quantity, natural zeolites are no longer able to satisfy the market demand. Therefore, there is an urgent need for a synthesis method with low-cost, low-energy, and high-purity.

SUMMARY

One or more embodiments of the present disclosure provide a method for preparing a zeolite based on waste incineration fly ash, comprising: step (a) subjecting the waste incineration fly ash to acid washing to remove impurities, followed by water washing and drying; and step (b) adding a mixture of $FeCl_3$ and $FeSO_4$ to washed and dried waste incineration fly ash, followed by mixing with a alkaline solution, putting into a ball milling tank together with grinding balls for a mechanical chemical reaction, and heating reaction materials in a process of ball milling to obtain the zeolite; wherein a mass ratio of $FeSO_4$ to $FeCl_3$ in the mixture is 5.5:1 and a mass ratio of the washed and dried waste incineration fly ash to the mixture is (5-10):1; a mass ratio of the grinding balls to the washed and dried waste incineration fly ash is (10-20):1, a rotational speed of the ball milling tank is within a range of 300-700 r/min, and a time of the ball milling is within a range of 2-10 h; a concentration of the alkaline solution is within a range of 2-4 mol/L and a liquid-solid mass ratio of the alkaline solution to the washed and dried waste incineration fly ash is (3-5):1; and an acid used in the acid washing is one of acetic acid, propionic acid, butyric acid, succinic acid, and lactic acid, and a concentration of the acid is within a range of 0.2-1 mol/L.

In some embodiments, in a process of the acid washing, a mass ratio of the acid to the waste incineration fly ash is (2-5):1, and a stirring time is within a range of 3-5 h.

In some embodiments, a mass ratio of silicon to aluminum in the waste incineration fly ash is (1.1-1.5):1.

In some embodiments, before subjecting the waste incineration fly ash to the acid washing to remove impurities in the step (a), the waste incineration fly ash is calcined and activated at a temperature of 650-750° C.

In some embodiments, the ball milling tank is a high-temperature ball mill, and a temperature in the ball milling tank is maintained at 100-300° C.

One or more embodiments of the present disclosure provide a zeolite prepared by the above method.

One or more embodiments of the present disclosure provide a use of the above zeolite in the efficient adsorption of heavy metals (such as copper, mercury, and cesium) and ammonia nitrogen in liquids.

BRIEF DESCRIPTION OF THE DRAWINGS

The present disclosure is further described in terms of exemplary embodiments. These exemplary embodiments are described in detail with reference to the drawings.

FIG. 1 is a flowchart illustrating a process for preparing a zeolite based on waste incineration fly ash according to some embodiments of the present disclosure.

DETAILED DESCRIPTION

In order to more clearly illustrate the technical solutions of the embodiments of the present disclosure, the following provides a brief introduction to the drawings required in the description of the embodiments. Obviously, drawings described below are only some examples or embodiments of the present disclosure. Those skilled in the art, without further creative efforts, may apply the present disclosure to other similar scenarios according to these drawings.

As used in the present disclosure and the claims, the singular forms "a", "an", and "the" may be intended to include the plural forms as well, unless the context clearly indicates otherwise. Generally, the terms "comprise" and "include" only indicate the inclusion of the clearly identified steps and elements, and the steps and elements do not constitute an exclusive list. A method or device may also include other steps or elements.

Unless otherwise defined, all technical and scientific terms used in the present disclosure have the same meanings as commonly understood by a person of ordinary skill in the technical field to which the present disclosure relates.

Embodiments of the present disclosure provide a zeolite based on waste incineration fly ash, a preparation method, and a use thereof.

In order to achieve the above purpose, the following technical means are adopted in the embodiments of the present disclosure.

A first aspect of the embodiments of the present disclosure provides a method for preparing a zeolite based on waste incineration fly ash, including following steps.

Step (a) subjecting the waste incineration fly ash to acid washing to remove impurities, followed by water washing and drying.

In some embodiments, a mass ratio of silicon to aluminum in the waste incineration fly ash is (1.1-1.5):1.

In some embodiments, the mass ratio of silicon to aluminum in the waste incineration fly ash is 1.1:1, 1.3:1, or 1.5:1.

In some embodiments, water washing and impurity removal are performed by suction filtration with deionized water.

In some embodiments, an acid used in the acid washing is one of acetic acid, propionic acid, butyric acid, succinic acid, and lactic acid, and a concentration of the acid is within a range of 0.2-1 mol/L.

In some embodiments, the acid is acetic acid, propionic acid, nitric acid, or hydrochloric acid and the concentration of the acid is 0.5 mol/L.

In some embodiments, in a process of the acid washing, a mass ratio of the acid to the waste incineration fly ash is (2-5):1, and a stirring time is within a range of 3-5 h.

In some embodiments, in the process of the acid washing, the mass ratio of the acid to the waste incineration fly ash is 2:1, and the stirring time is 3 h. In the process of the acid washing, the mass ratio of the acid to the waste incineration fly ash is 3:1, and the stirring time is 4 h or 5 h. In some embodiments, in the process of the acid washing, the mass ratio of the acid to the waste incineration fly ash is 5:1, and the stirring time is 3 h or 5 h.

In some embodiments, before subjecting the waste incineration fly ash to the acid washing to remove impurities in the step (a), the waste incineration fly ash is calcined and activated at a temperature of 650-750° C.

In some embodiments, before subjecting the waste incineration fly ash to the acid washing to remove impurities in the step (a), the waste incineration fly ash is calcined and activated at a temperature of 650° C. or 750° C.

Step (b) adding a mixture of $FeCl_3$ and $FeSO_4$ to washed and dried waste incineration fly ash, followed by mixing with an alkaline solution, putting into a ball milling tank together with grinding balls for a mechanical chemical reaction, and heating reaction materials in a process of ball milling to obtain the zeolite.

In the step (b), a mass ratio of $FeSO_4$ to $FeCl_3$ in the mixture is (4-7):1, and a mass ratio of the washed and dried waste incineration fly ash to the mixture is (5-10):1. In some embodiments, the mass ratio of $FeSO_4$ to $FeCl_3$ in the mixture is 4:1, 5:1, 5.3:1, 5.5:1, 6:1, or 7:1, preferably 5.5:1.

In some embodiments, a concentration of the alkaline solution is within a range of 2-4 mol/L and a liquid-solid mass ratio of the alkaline solution to the washed and dried waste incineration fly ash is (3-5):1. In some embodiments, the concentration of the alkaline solution is 2 mol/L, 3 mol/L, or 4 mol/L, and the liquid-solid mass ratio of the alkaline solution to the washed and dried waste incineration fly ash is 3:1.

In some embodiments, in the ball milling tank, a mass ratio of the grinding balls to the washed and dried waste incineration fly ash is (10-20):1, a rotational speed of the ball milling tank is within a range of 300-700 r/min, and a time of the ball milling is within a range of 2-10 h.

In some embodiments, in the ball milling tank, the mass ratio of the grinding balls to the washed and dried waste incineration fly ash is 15:1, the rotational speed of the ball milling tank is 600 r/min, and the time of the ball milling is 4 h.

In some embodiments, in the ball milling tank, the mass ratio of the grinding balls to the washed and dried waste incineration fly ash is 20:1, the rotational speed of the ball milling tank is 700 r/min, and the time of the ball milling is 6 h.

In some embodiments, in the ball milling tank, the mass ratio of the grinding balls to the washed and dried waste incineration fly ash is 10:1, the rotational speed of the ball milling tank is 500 r/min, and the time of the ball milling is 8 h.

In some embodiments, in the ball milling tank, the mass ratio of the grinding balls to the washed and dried waste incineration fly ash is 20:1, the rotational speed of the ball milling tank is 600 r/min, and the time of the ball milling is 10 h.

In some embodiments, in the ball milling tank, the mass ratio of the grinding balls to the washed and dried waste incineration fly ash is 15:1, the rotational speed of the ball milling tank is 700 r/min, and the time of the ball milling is 2 h.

In some embodiments, in the ball milling tank, the mass ratio of the grinding balls to the washed and dried waste incineration fly ash is 20:1, the rotational speed of the ball milling tank is 400 r/min, and the time of the ball milling is 5 h.

In some embodiments, the ball milling tank is a high-temperature ball mill, and a temperature in the ball milling tank is maintained at 100-300° C.

In some embodiments, the ball milling tank is a high-temperature ball mill, and the temperature in the ball milling tank is maintained at 100° C., 200° C., or 300° C.

A second aspect of the embodiments of the present disclosure provides a zeolite, prepared by the above method.

A third aspect of the embodiments of the present disclosure provides a use of the above zeolite in the highly efficient adsorption of heavy metals (such as copper, mercury, and cesium) and ammonia nitrogen in liquids.

As shown in FIG. 1, the embodiments of the present disclosure provide a method for preparing a zeolite based on waste incineration fly ash, including following steps.

Step (a) subjecting the waste incineration fly ash with a mass ratio of silicon to aluminum of (1.1-1.5):1 to acid washing to remove impurities, followed by water washing for impurity removal via suction filtration with the deionized water. An acid used in the acid washing is one of acetic acid, propionic acid, butyric acid, succinic acid, and lactic acid, and a concentration of the acid is within a range of 0.2-1 mol/L. A mass ratio of the acid to the waste incineration fly ash is (2-5):1, and a stirring time in the process of the acid washing is within a range of 3-5 h.

Step (b) adding a mixture of $FeCl_3$ and $FeSO_4$ to washed and dried waste incineration fly ash, a mass ratio of $FeSO_4$ to $FeCl_3$ in the mixture being (5-6):1, and a mass ratio of the washed and dried waste incineration fly ash to the mixture being (5-10):1; followed by mixing with an alkaline solution with a concentration of 2-4 mol/L, and putting into a ball milling tank together with grinding balls, a liquid-solid mass ratio of the alkaline solution to the washed and dried waste incineration fly ash being (3-5):1, and a mass ratio of the grinding balls to the washed and dried waste incineration fly ash being (10-20):1; and heating reaction materials in a process of ball milling to obtain zeolite, a rotational speed of the ball milling tank being within a range of 300-700 r/min, and a time of the ball milling being within a range of 2-10 h. The ball milling tank is a high-temperature ball mill, and a temperature in the ball milling tank is maintained at 100-300° C.

Before subjecting the waste incineration fly ash to the acid washing to remove impurities in the step (a), the waste incineration fly ash is calcined and activated at a temperature of 650-750° C.

The embodiments of the present disclosure have at least the following beneficial effects.

The preparation of zeolite from waste incineration fly ash can dispose of the waste incineration fly ash, realizing high-value utilization of the waste incineration fly ash, replacing the landfilling of the waste incineration fly ash resulting in land occupation, and reducing environmental pollution.

The embodiments of the present disclosure effectively remove most impurities by subjecting the waste incineration fly ash to acid washing before synthesis, increasing the ratio of silicon to aluminum, thus helping to improve the purity of the synthesized zeolite. In addition, the modification of the zeolite during the synthesis process not only improves the adsorption performance of the zeolite, but also significantly shortens the preparation time. The zeolite prepared by the method of the embodiments of the present disclosure is a magnetic zeolite. After adsorbing pollutants, it can be conveniently separated and recovered from the disposal object. Meanwhile, the zeolite has good reusability, which can be applied to efficiently adsorb heavy metals (such as copper, mercury, and cesium) and ammonia nitrogen in liquids.

The following examples provide some more specific illustrations related to the above embodiments. Some elements in the embodiments may also be replaced or combined with corresponding elements in other embodiments to form new embodiments. The experimental methods in the following examples are conventional if not otherwise stated. The experimental materials used in the following examples are, if not otherwise specified, obtained by purchase from a conventional biochemical reagent company. The quantitative tests in the following examples are set up with three repetitions of the experiment, and the results are averaged. It should be appreciated that the following examples are intended to better explain the present disclosure, and not intended to limit the scope of the present disclosure.

EXAMPLES

Example 1

Waste incineration fly ash with a mass ratio of silicon to aluminum of 1.1:1 was used as a raw material. 0.5 mol/L acetic acid was added to the waste incineration fly ash, and a mass ratio of the acetic acid to the waste incineration fly ash was controlled to be 2:1, followed by stirring for 3 h. After adding deionized water for suction filtration, impurities were removed by washing, followed by drying. $FeSO_4$ and $FeCl_3$ were mixed at a mass ratio of 5:1 to obtain a mixture. The washed and dried waste incineration fly ash was mixed with the above mixture at a mass ratio of 5:1, then a NaOH solution with a concentration of 2 mol/L was added for mixing, and a liquid-solid mass ratio of the NaOH to the washed and dried waste incineration fly ash was maintained at 3:1. Subsequently, grinding balls were added, and a mass ratio of the grinding balls to the washed and dried waste incineration fly ash was 15:1, followed by putting into a 200 mL zirconia ball milling tank. The ball milling tank was placed into a planetary ball mill, a rotational speed was set to 600 rpm, and a time of the ball milling was 4 h. A high-temperature ball mill was used for heating to keep a temperature in the ball milling tank at 100° C. A zeolite was obtained after the ball milling was completed.

Example 2

The main process was the same as that in Example 1, with the difference that 0.5 mol/L acetic acid was replaced with 0.5 mol/L propionic acid.

Example 3

The main process was the same as that in Example 1, with the difference that 0.5 mol/L acetic acid was replaced with 0.5 mol/L nitric acid.

Example 4

The main process was the same as that in Example 1, with the difference that 0.5 mol/L acetic acid was replaced with 0.5 mol/L hydrochloric acid.

Example 5

The main process was the same as that in Example 1, with the difference that the acid washing for impurity removal is omitted, and the waste incineration fly ash is directly used for ball milling to synthesize a zeolite.

The above Examples 1 to 5 explored an influence of the acid washing on the adsorption performance of the zeolite in the process of preparing the zeolite based on the waste incineration fly ash. Adsorption experiments for copper and ammonia nitrogen were conducted using the zeolites prepared in the above Examples 1 to 5:0.4 g of the prepared zeolite was mixed with 200 mL of a simulated solution, stirred at 120 rpm for 30 min, and centrifuged at 5500 rpm for 5 min to obtain a supernatant and a separated slurry. The initial concentrations of copper and ammonia nitrogen in the simulated solution were both 200 mg/L.

The adsorption results of the zeolites prepared in Examples 1 to 5 are shown in Table 1.

TABLE 1

| Adsorption results of zeolites | | |
|---|---|---|
| | Adsorption capacity | |
| Synthesis route | Copper (mg/g) | Ammonia nitrogen (mg/g) |
| Example 1 | 45.2 | 42.5 |
| Example 2 | 44.6 | 42.4 |

TABLE 1-continued

| Adsorption results of zeolites | | |
| --- | --- | --- |
| | Adsorption capacity | |
| Synthesis route | Copper (mg/g) | Ammonia nitrogen (mg/g) |
| Example 3 | 41.5 | 39.8 |
| Example 4 | 42.1 | 40.3 |
| Example 5 | 38.2 | 33.1 |

The results indicate that the acid washing is beneficial to improving the adsorption performance of the zeolite. In the process of the acid washing, the adsorption effect achieved by using organic acid for acid washing is more superior compared to inorganic acid.

Example 6

The main process was the same as that in Example 1, with the difference that a concentration of the NaOH solution in the ball milling stage was 1 mol/L.

Example 7

The main process was the same as that in Example 1, with the difference that a concentration of the NaOH solution in the ball milling stage was 3 mol/L.

Example 8

The main process was the same as that in Example 1, with the difference that a concentration of the NaOH solution in the ball milling stage was 4 mol/L.

The above Examples 6 to 8 explored an influence of the concentration of the NaOH solution in the ball milling stage on the adsorption performance of the zeolite in the process of preparing the zeolite based on the waste incineration fly ash. Adsorption experiments for copper and ammonia nitrogen were conducted using the zeolites prepared in the above Examples 6 to 8:0. 4 g of the prepared zeolite was mixed with 200 mL of a simulated solution, stirred at 120 rpm for 30 min, and centrifuged at 5500 rpm for 5 min to obtain a supernatant and a separated slurry. The initial concentrations of copper and ammonia nitrogen in the simulated solution were both 200 mg/L.

The adsorption results of the zeolites prepared in Examples 6 to 8 are shown in Table 2.

TABLE 2

| Adsorption results of zeolites | | |
| --- | --- | --- |
| | Adsorption capacity | |
| Synthesis route | Copper (mg/g) | Ammonia nitrogen (mg/g) |
| Example 1 | 45.2 | 42.5 |
| Example 6 | 32.6 | 30.8 |
| Example 7 | 49.1 | 43.3 |
| Example 8 | 48.4 | 42.7 |

The results indicate that in the ball milling stage of preparing the zeolite from the waste incineration fly ash, the concentration of the NaOH solution has a significant effect on the adsorption performance of the zeolite. The concentration of the NaOH solution should not be too low, and when the concentration of the NaOH solution exceeds 2 mol/L, the prepared zeolite exhibits better adsorption performance.

Example 9

The main process was the same as that of Example 1, with the difference that a mass ratio of $FeSO_4$ to $FeCl_3$ in the ball milling stage was 5.5:1.

Example 10

The main process was the same as that of Example 1, with the difference that a mass ratio of $FeSO_4$ to $FeCl_3$ in the ball milling stage was 6:1.

Example 11

The main process was the same as that of Example 1, with the difference that a mass ratio of $FeSO_4$ to $FeCl_3$ in the ball milling stage was 4:1.

Example 12

The main process was the same as that of Example 1, with the difference that a mass ratio of $FeSO_4$ to $FeCl_3$ in the ball milling stage was 7:1.

The above Examples 9 to 12 explored an influence of the mass ratio of $FeSO_4$ to $FeCl_3$ in the ball milling stage on the adsorption performance of the zeolite in the process of preparing the zeolite based on the waste incineration fly ash. Adsorption experiments for copper and ammonia nitrogen were conducted using the zeolites prepared in the above Examples 9 to 12:0.4 g of the prepared zeolite was mixed with 200 mL of a simulated solution, stirred at 120 rpm for 30 min, and centrifuged at 5500 rpm for 5 min to obtain a supernatant and a separated slurry. The initial concentrations of copper and ammonia nitrogen in the simulated solution were both 200 mg/L.

The adsorption results of the zeolites prepared in Examples 9 to 12 are shown in Table 3.

TABLE 3

| Adsorption results of zeolites | | |
| --- | --- | --- |
| | Adsorption capacity | |
| Synthesis route | Copper (mg/g) | Ammonia nitrogen (mg/g) |
| Example 1 | 45.2 | 42.5 |
| Example 9 | 50.5 | 47.5 |
| Example 10 | 39.8 | 35.6 |
| Example 11 | 41.7 | 38.2 |
| Example 12 | 30.1 | 28.9 |

The results indicate that in the ball milling stage of preparing the zeolite from the waste incineration fly ash, the mass ratio of $FeSO_4$ to $FeCl_3$ for modification has a significant effect on the adsorption performance of the zeolite. When the mass ratio of $FeSO_4$ to $FeCl_3$ is 5.5:1, the adsorption performance of the zeolite is optimal.

Example 13

Waste incineration fly ash with a mass ratio of silicon to aluminum of 1.1:1 was used as a raw material. 0.5 mol/L acetic acid was added to the raw material, and a mass ratio of acetic acid to the waste incineration fly ash was controlled to be 2:1, followed by stirring for 3 h. After adding deionized water for suction filtration, impurities were removed by washing, followed by drying. A NaOH solution with a concentration of 2 mol/L was added to the washed and dried waste incineration fly ash, and a liquid-solid mass ratio of the NaOH solution to the washed and dried waste incineration fly ash was maintained at 3:1. Subsequently, grinding balls were added and a mass ratio of the grinding balls to the washed and dried waste incineration fly ash was 15:1, followed by putting into a 200 mL zirconia ball milling tank. The ball milling tank was placed into a planetary ball mill, a rotational speed was set to 600 rpm, and a time of the ball milling was 4 h. A high-temperature ball mill was used for heating to keep a temperature in the ball milling tank at 100° C. A zeolite was obtained after the ball milling was completed.

Example 14

Waste incineration fly ash with a mass ratio of silicon to aluminum of 1.3:1 was used as a raw material. 1 mol/L succinic acid was added to the raw material, and a mass ratio of the succinic acid to the waste incineration fly ash was controlled to be 5:1, followed by stirring for 5 h. After adding deionized water for suction filtration, impurities were removed by washing, followed by drying. $FeSO_4$ and $FeCl_3$ were mixed at a mass ratio of 5.5:1 to obtain a mixture. The washed and dried waste incineration fly ash was mixed with the above mixture in a mass ratio of 9:1, then a NaOH solution with a concentration of 3 mol/L was added for mixing, and a liquid-solid mass ratio of the NaOH solution to the washed and dried waste incineration fly ash was maintained at 5:1. Subsequently, grinding balls were added and a mass ratio of the grinding balls the washed and dried waste incineration fly ash was 20:1, followed by putting into a 500 mL zirconia ball milling tank. The ball milling tank was placed into a planetary ball mill, a rotational speed was set to 700 rpm, and a time of the ball milling was 6 h. A high-temperature ball mill was used for heating to keep a temperature in the ball milling tank at 200° C. A zeolite was obtained after the ball milling was completed.

Example 15

Waste incineration fly ash with a mass ratio of silicon to aluminum of 1.5:1 was used as a raw material. 0.5 mol/L butyric acid was added to the raw material, and a mass ratio of butyric acid to the waste incineration fly ash was controlled to be 3:1, followed by stirring for 4 h. After adding deionized water for suction filtration, impurities were removed by washing, followed by drying. $FeSO_4$ and $FeCl_3$ were mixed at a mass ratio of 5.3:1 to obtain a mixture. The washed and dried waste incineration fly ash was mixed with the above mixture at a mass ratio of 7:1, then a NaOH solution with a concentration of 4 mol/L was added for mixing, and a liquid-solid mass ratio of the NaOH solution to the washed and dried waste incineration fly ash was maintained at 4:1. Subsequently, grinding balls were added, and to a mass ratio of the grinding balls to the washed and dried waste incineration fly ash was 10:1, followed by putting into a 600 mL zirconia ball milling tank. The ball milling tank was placed into a planetary ball mill, a rotational speed was set to 500 rpm, and a time of the ball milling was 8 h. A high-temperature ball mill was used for heating to keep a temperature in the ball milling tank at 300° C. A zeolite was obtained after the ball milling was completed.

Example 16

Waste incineration fly ash calcined at 650° C. was used as a raw material. 0.8 mol/L lactic acid was added to the raw material, and a mass ratio of the lactic acid to the waste incineration fly ash was controlled to be 5:1, followed by stirring for 3 h. After adding deionized water for suction filtration, impurities were removed by washing, followed by drying. $FeSO_4$ and $FeCl_3$ were mixed at a mass ratio of 6:1 to obtain a mixture. The washed and dried waste incineration fly ash was mixed with the above mixture at a mass ratio of 10:1, then a NaOH solution with a concentration of 4 mol/L was added for mixing, and a liquid-solid mass ratio of the NaOH solution to the washed and dried waste incineration fly ash was maintained at 4:1. Subsequently, grinding balls were added, and a mass ratio of the grinding balls to the washed and dried waste incineration fly ash was 20:1, followed by putting into a 1000 mL zirconia ball milling tank. The ball milling tank was placed into a planetary ball mill, a rotational speed was set to 600 rpm, and a time of the ball milling was 10 h. A high-temperature ball mill was used for heating to keep a temperature in the ball milling tank was maintained at 200° C. A zeolite was obtained after the ball milling was completed.

Example 17

Waste incineration fly ash calcined at 750° C. was used as a raw material. 0.5 mol/L acetic acid was added to the raw material, and a mass ratio of the acetic acid to the waste incineration fly ash was controlled to be 3:1, followed by stirring for 5 h. After adding deionized water for suction filtration, impurities were removed by washing, followed by drying. $FeSO_4$ and $FeCl_3$ were mixed at a mass ratio of 5.5:1 to obtain a mixture. The washed and dried waste incineration fly ash was mixed with the above mixture at a mass ratio of 10:1, then a NaOH solution with a concentration of 3 mol/L was added for mixing, and a liquid-solid mass ratio of the NaOH solution to the washed and dried waste incineration fly ash was maintained at 5:1. Subsequently, grinding balls were added, and a mass ratio of the grinding balls to the washed and dried waste incineration fly ash was 15:1, followed by putting into a 700 mL zirconia ball milling tank. The ball milling tank was placed into a planetary ball mill, a rotational speed was set to 700 rpm, and a time of the ball milling was 2 h. A high-temperature ball mill was used for heating to keep a temperature in the ball milling tank at 300° C. A zeolite was obtained after the ball milling was completed.

Example 18

Waste incineration fly ash calcined at 650° C. was used as a raw material. 0.8 mol/L propionic acid was added, and a mass ratio of the propionic acid to the waste incineration fly ash was controlled to be 5:1, followed by stirring for 5 h. After adding deionized water for suction filtration, impurities were removed by washing, followed by drying. $FeSO_4$ and $FeCl_3$ were mixed at a mass ratio of 5.8:1 to obtain a mixture. The washed and dried waste incineration fly ash was mixed with the above mixture at a mass ratio of 5:1, then a NaOH solution with a concentration of 3 mol/L was added for mixing, and a liquid-solid mass ratio of the NaOH solution to the washed and dried waste incineration fly ash was maintained at 4:1. Subsequently, grinding balls were added, and a mass ratio of the grinding balls to the washed and dried waste incineration fly ash was 20:1. The mixture was then placed into a 500 mL zirconia ball milling tank. The ball milling tank was placed into a planetary ball mill, a rotational speed was set to 400 rpm, and a time of the ball milling was 5 h. A high-temperature ball mill was used for heating to keep a temperature in the ball milling tank at 200° C. A zeolite was obtained after the ball milling was completed.

Comparative Example 1

A zeolite was prepared using waste incineration fly ash as a raw material via a conventional hydrothermal synthesis method: 4 g of waste incineration fly ash was added to 1 mol/L acetic acid for acid washing, dried, and ball-milled for 0.5 h for activation. Then 20 mL of deionized water was added for hydrothermal synthesis at 180° C. for 12 h to obtain the zeolite.

The adsorption performance of the zeolite prepared under different synthesis conditions and synthesis methods in Example 1, Examples 13 to 18, and Comparative Example 1 above were explored. Adsorption experiments for copper, mercury, ammonia nitrogen, and cesium were conducted as follows: 0.4 g of the prepared zeolite was mixed with 200 mL of a simulated solution, stirred at 120 rpm for 30 min, and centrifuged at 5500 rpm for 5 min to obtain a supernatant and a separated slurry. The initial concentrations of copper, mercury, ammonia nitrogen, and cesium in the simulation liquid were all 200 mg/L.

The adsorption results of the zeolites prepared in Examples 13 to 18 and Comparative Example 1 are shown in Table 4.

When the mass ratio of $FeSO_4$ to $FeCl_3$ used for modification is controlled at 5.5:1, the adsorption performance of the prepared zeolite for copper, mercury, ammonia nitrogen, and cesium is significantly enhanced.

Example 19

After the adsorption experiment, the zeolite from Example 1 was recovered using a magnet and immersed in 100 mL of 1 mol/L NaCl solution for approximately 30 min, to obtain a primary recycled zeolite.

Example 20

After the adsorption experiment, the zeolite from Example 19 was recovered using a magnet and immersed in 100 mL of 1 mol/L NaCl solution for about 30 min, followed by re-adsorption and recovering using the magnet and immersing in 100 mL of 1 mol/L NaCl solution to obtain a three-time recycled zeolite.

Example 21

The zeolite from Example 1 was recovered six times using the method described in Example 20 to obtain a six-time recycled zeolite.

The adsorption performance of the zeolites recycled for different times in Examples 19 to 21 was explored. Adsorption experiments for copper, mercury, ammonia nitrogen, and cesium were conducted as follows: 0.4 g of the prepared zeolite was mixed with 200 mL of a simulated solution,

TABLE 4

Adsorption results of zeolites

| | | | Adsorption capacity | |
| Synthesis route | Copper (mg/g) | Mercury (mg/g) | Ammonia nitrogen (mg/g) | Cesium (mg/g) |
| --- | --- | --- | --- | --- |
| Example 1 | 45.2 | 22.5 | 42.5 | 73.2 |
| Example 13 | 34.7 | 17.2 | 25.4 | 40.3 |
| Example 14 | 48.9 | 24.3 | 44.5 | 76.8 |
| Example 15 | 43.7 | 21.9 | 41.7 | 71.5 |
| Example 16 | 46.9 | 23.5 | 43.2 | 74.7 |
| Example 17 | 47.6 | 23.7 | 43.8 | 75.3 |
| Example 18 | 46.5 | 22.8 | 42.9 | 74.1 |
| Comparative Example 1 | 39.8 | 15.6 | 16.2 | 30.7 |

The results indicate that the zeolite unmodified with $FeSO_4$ and $FeCl_3$ exhibit poor adsorption performance. Specifically, its adsorption performance for copper is worse than that of the zeolite prepared by the conventional hydrothermal method. In contrast, its adsorption performance for mercury, ammonia nitrogen, and cesium is superior than that of the zeolite prepared by the conventional hydrothermal method.

stirred at 120 rpm for 30 min, and centrifuged at 5500 rpm for 5 min to obtain a supernatant and a separated slurry. The initial concentrations of copper, mercury, ammonia nitrogen, and cesium in the simulated solution were all 200 mg/L.

The adsorption results of the zeolites obtained prepared in Example 1, Examples 19 to 21, and Comparative Example 1 are shown in Table 5.

TABLE 5

Adsorption results of zeolites

| | | | Adsorption capacity | |
| Synthesis route | Copper (mg/g) | Mercury (mg/g) | Ammonia nitrogen (mg/g) | Cesium (mg/g) |
| --- | --- | --- | --- | --- |
| Example 1 | 45.2 | 22.5 | 42.5 | 73.2 |
| Example 19 | 45.2 | 22.0 | 42.3 | 72.8 |

TABLE 5-continued

| | Adsorption results of zeolites | | | |
| --- | --- | --- | --- | --- |
| | Adsorption capacity | | | |
| Synthesis route | Copper (mg/g) | Mercury (mg/g) | Ammonia nitrogen (mg/g) | Cesium (mg/g) |
| Example 20 | 45.2 | 20.1 | 40.1 | 69.4 |
| Example 21 | 45.2 | 16.5 | 36.1 | 58.5 |
| Comparative Example 1 | 39.8 | 15.6 | 16.2 | 30.7 |

The results indicate that the zeolite prepared in the examples of the present disclosure has a unchanged adsorption capacity for copper after six recycling cycles. The decreases in adsorption performance of the zeolite for mercury, ammonia nitrogen, and cesium are as follows: after one recovery and re-adsorption, the adsorption capacities decrease by 2.22% for mercury, 0.47% for ammonia nitrogen, and 0.55% for cesium; after three recoveries and re-adsorption, the adsorption capacities decrease by 10.67% for mercury, 5.65% for ammonia nitrogen, and 5.19% for cesium; after six recoveries and re-adsorption, the adsorption capacities decrease by 26.67% for mercury, 15.06% for ammonia nitrogen, and 20.08% for cesium. Even after six recycling cycles and re-adsorption, the zeolite still exhibits superior adsorption performance for copper, mercury, ammonia nitrogen, and cesium compared to the zeolite prepared by the conventional hydrothermal synthesis method, indicating favorable recyclability.

The basic concepts have been described above, and it is apparent to those skilled in the art that the foregoing detailed disclosure serves only as an example and does not constitute a limitation of the present disclosure. While not expressly stated herein, various alterations, improvements, and modifications may be made by those skilled in the art. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment", "an embodiment" and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

Further, unless explicitly stated in the claims, the order of processing elements and sequences, the use of numerical letters, or the use of other names described in the present disclosure is not intended to limit the order of the processes and methods herein. Although various examples have been discussed in the above disclosure to address some presently considered useful embodiments of the invention, it should be understood that such details are for illustrative purposes only. The appended claims are not limited to the disclosed embodiments. On the contrary, the claims are intended to cover all modifications and equivalent combinations that conform to the essence and scope of the embodiments herein.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for preparing a zeolite based on waste incineration fly ash, comprising:

step (a) subjecting the waste incineration fly ash to acid washing to remove impurities, followed by water washing and drying; and step (b) adding a mixture of $FeCl_3$ and $FeSO_4$ to washed and dried waste incineration fly ash, followed by mixing with an alkaline solution, putting into a ball milling tank together with grinding balls for a mechanical chemical reaction, and heating reaction materials in a process of ball milling to obtain the zeolite;

wherein a mass ratio of $FeSO_4$ to $FeCl_3$ in the mixture is 5.5:1 and a mass ratio of the washed and dried waste incineration fly ash to the mixture is (5-10):1;

a mass ratio of the grinding balls to the washed and dried waste incineration fly ash is (10-20):1, a rotational speed of the ball milling tank is within a range of 300-700 r/min, and a time of the ball milling is within a range of 2-10 h;

a concentration of the alkaline solution is within a range of 2-4 mol/L and a liquid-solid mass ratio of the alkaline solution to the washed and dried waste incineration fly ash is (3-5):1;

an acid used in the acid washing is one of acetic acid, propionic acid, butyric acid, succinic acid, and lactic acid, and a concentration of the acid is within a range of 0.2-1 mol/L; and in a process of the acid washing, a mass ratio of the acid to the waste incineration fly ash is (2-5):1, and a stirring time is within a range of 3-5 h.

2. The method of claim 1, wherein a mass ratio of silicon to aluminum in the waste incineration fly ash is (1.1-1.5):1.

3. The method of claim 1, wherein before subjecting the waste incineration fly ash to the acid washing to remove impurities in the step (a), the waste incineration fly ash is calcined and activated at a temperature of 650-750° C.

4. The method of claim 1, wherein the ball milling tank is a high-temperature ball mill, and a temperature in the ball milling tank is maintained at 100-300° C.

5. A method for preparing a zeolite based on waste incineration fly ash, comprising:

step (a) subjecting the waste incineration fly ash to acid washing to remove impurities, followed by water washing and drying; and step (b) adding a mixture of $FeCl_3$ and $FeSO_4$ to washed and dried waste incineration fly ash, followed by mixing with an alkaline solution, putting into a ball milling tank together with grinding balls for a mechanical chemical reaction, and heating reaction materials in a process of ball milling to obtain the zeolite;

wherein a mass ratio of $FeSO_4$ to $FeCl_3$ in the mixture is 5.5:1 and a mass ratio of the washed and dried waste incineration fly ash to the mixture is (5-10):1;

a mass ratio of the grinding balls to the washed and dried waste incineration fly ash is (10-20):1, a rotational speed of the ball milling tank is within a range of 300-700 r/min, and a time of the ball milling is within a range of 2-10 h;

a concentration of the alkaline solution is within a range of 2-4 mol/L and a liquid-solid mass ratio of the alkaline solution to the washed and dried waste incineration fly ash is (3-5):1;

an acid used in the acid washing is one of acetic acid, propionic acid, butyric acid, succinic acid, and lactic acid, and a concentration of the acid is within a range of 0.2-1 mol/L; and a mass ratio of silicon to aluminum in the waste incineration fly ash is (1.1-1.5):1.

6. A method for preparing a zeolite based on waste incineration fly ash, comprising:

step (a) subjecting the waste incineration fly ash to acid washing to remove impurities, followed by water washing and drying; and step (b) adding a mixture of $FeCl_3$ and $FeSO_4$ to washed and dried waste incineration fly ash, followed by mixing with an alkaline solution, putting into a ball milling tank together with grinding balls for a mechanical chemical reaction, and heating reaction materials in a process of ball milling to obtain the zeolite;

wherein a mass ratio of $FeSO_4$ to $FeCl_3$ in the mixture is 5.5:1 and a mass ratio of the washed and dried waste incineration fly ash to the mixture is (5-10):1;

a mass ratio of the grinding balls to the washed and dried waste incineration fly ash is (10-20):1, a rotational speed of the ball milling tank is within a range of 300-700 r/min, and a time of the ball milling is within a range of 2-10 h;

a concentration of the alkaline solution is within a range of 2-4 mol/L and a liquid-solid mass ratio of the alkaline solution to the washed and dried waste incineration fly ash is (3-5):1;

an acid used in the acid washing is one of acetic acid, propionic acid, butyric acid, succinic acid, and lactic acid, and a concentration of the acid is within a range of 0.2-1 mol/L; and the ball milling tank is a high-temperature ball mill, and a temperature in the ball milling tank is maintained at 100-300° C.

* * * * *